FIG.1.

Nov. 23, 1971 G. A. IRELAND 3,621,718
TEMPERATURE-COMPENSATED PRESSURE-RESPONSIVE INSTRUMENT
Filed July 7, 1969 4 Sheets-Sheet 2

INVENTOR
GRAHAM A. IRELAND

BY *Smart of Biggs*
ATTORNEYS

INVENTOR
GRAHAM A. IRELAND
BY Smart & Biggar
ATTORNEYS 3,621,718
TEMPERATURE-COMPENSATED PRESSURE-
RESPONSIVE INSTRUMENT
Graham A. Ireland, Ottawa, Ontario, Canada, assignor to
Leigh Instruments, Carleton Place, Ontario, Canada
Filed July 7, 1969, Ser. No. 839,724
Int. Cl. G01l 19/04
U.S. Cl. 73—393                                                15 Claims

ABSTRACT OF THE DISCLOSURE

A pressure-responsive instrument such as an altimeter having the following three temperature-compensating features:

(1) The aneroid capsule hub assembly has a cup-shaped hub element whose contraction matches the expansion of the fittings of the capsule hub assembly.

(2) The connecting linkage between the hub element and the shaft driven thereby is made of materials having a temperature coefficient of expansion selected to match that of the capsules as mounted.

(3) The shaft at the point of attachment of the connecting linkage is displaced to compensate for the thermal displacement of the instrument frame, preferably by mounting one bearing of the shaft on an annular ring having a different coefficient of expansion from that of the frame at about 90° from the two diametrically-opposite points of attachment of the ring to the frame.

BACKGROUND OF THE INVENTION

This invention relates to temperature-compensated pressure-responsive devices and particularly to temperature-compensated altimeters for use in aircraft.

The specific example of a pressure-responsive device that will be described in this specification is an aircraft altimeter, but it is to be understood that other instruments and indicators which are responsive to variations in pressure, including both those which are responsive to atmospheric pressure such as altitude transducers and barometers, and those which are responsive to pressures greater than atmospheric pressure including air speed indicators, dynamic pressure transducers and static pressure transducers, can be constructed using the principles of the present invention, and the necessary changes and modifications for any specific instrument or indicator will be apparent to those skilled in the technology.

In a pressure responsive device such as an aircraft altimeter, aneroid capsules are used to drive mechanical linkage that in turn drives an indicating mechanism. Ordinarily, the expansion of the aneroid capsule varies nearly linearly and inversely with pressure. However, altitude is not a linear function of pressure, and therefore the mechanical linkage connecting the aneroid capsule to the indicating mechanism is in general non-linear. An aircraft altimeter may encounter drastic temperature variations. The metal in the altimeter frame, in the aneroid capsules, and in the mechanical linkages is subject to expansion and contraction as the ambient temperature of the instrument increases and decreases. Because of the relatively small absolute movement of the aneroid capsules with pressure, it can be seen that any spurious movement caused by temperature variations can lead to a significantly inaccurate altitude reading.

SUMMARY OF THE INVENTION

In general, the linear motion of the aneroid capsules is translated, by a connecting link and crank assembly, into rotary motion of a shaft which, through an appropriate gear train, drives the indicating mechanism. The three points of connection (1) of the aneroid assembly to the connecting arm, (2) of the connecting link to the crank, and (3) of the crank to the shaft (the last one being a rigid connection) form the apexes of a reference triangle. According to the present invention the angles of this triangle are kept constant over the temperature range of interest, so that the shaft will not rotate as a result of temperature change, but only as a function of altitude which is the result desired. This result is achieved, according to a preferred embodiment of the present invention, by the following measures:

(1) The aneroid capsule hub assembly includes a cup-shaped (or C-shaped, etc.) element one end of which is fixed to the outer end of the hub and the other, free end of which projects inwardly into the interior of the hub assembly and is pivotally connected to the connecting arm. By proper selection of dimensions and materials, the inward expansion of the cup-shaped element can exactly cancel the outward expansion of the fittings for the hub assembly.

(2) The connecting link and crank are made of materials having a net temperature coefficient of expansion corresponding to that of the aneroid capsules as mounted. The connecting link and crank are the physical elements which determine two of the three sides of the above-mentioned reference triangle. The third side has no direct physical counterpart, but if the point of attachment of the crank to the shaft moves in response to temperature change as if the third side of the triangle were made of the same material as the link and crank, then the angles of the triangle would be constant over the temperature change, as desired.

(3) Accordingly, a bimetallic system is employed to vary the third side of the reference triangle as desired. In the preferred embodiments, each end of the shaft is rotatably mounted in a bearing, one of which is mounted in the frame and the other is mounted in a circular ring at about 90° from the only two diametrically-opposite points of attachment of the circular ring to the frame. If the frame is made of a material having a higher coefficient of expansion than the ring material and than the connecting arm and crank material, then the ring is mounted within the frame and, the bearing in the ring can be constrained to move in opposition to the movement of the frame with temperature variations. As a result, the displacement of the shaft at the point of attachment of the crank can be that required to maintain the reference triangle similar to the reference triangle at any other temperature over the temperature range of interest.

If the frame has a lower coefficient of expansion than that of the aneroid capsules, then the ring could be made of a material having a higher coefficient of expansion than that of the frame and would be mounted outside the frame.

An altimeter constructed in accordance with the present invention was found to be satisfactorily temperature-compensated for altitudes up to at least 80,000 feet over a temperature range of −54° C. to +71° C.

DETAILED DESCRIPTION WITH REFERENCE TO THE DRAWINGS

Figure 1:
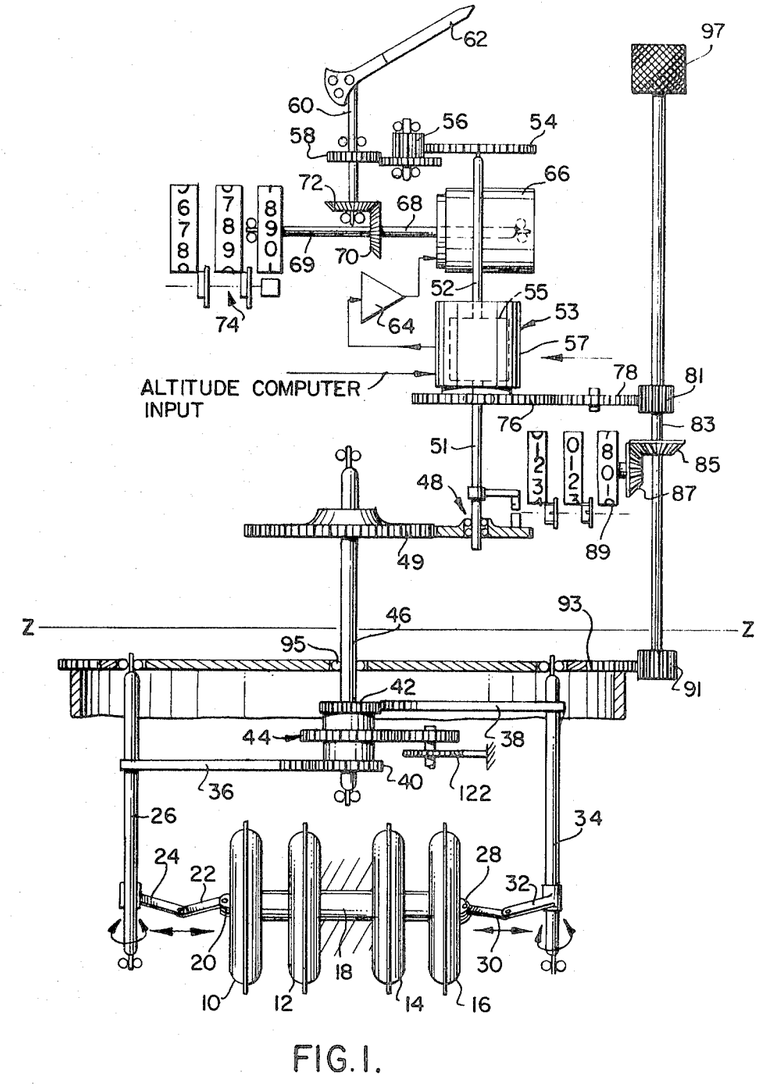
FIG. 1 is a schematic diagram of an aircraft altimeter having a barometric portion which may be constructed in accordance with the present invention.

Referring to FIG. 1, aneroid capsules 10, 12, on one side and 14, 16 on the other side, are mounted on a central mounting piece 18 which is fixed to the frame of the barometric sub-assembly of the altimeter. A pressure decrease results in expansion of the hub portions of the aneroid capsules and in the case of the left hand pair of capsules 10, 12, is transmitted via hub connections (not shown in FIG. 1) to a hub connecting post 20 which is pivotally attached to connecting link 22 which in turn is pivotally attached to a crank 24 fixed to a rotatably mounted rocker shaft 26. Corresponding elements 28, 30, 32 and 34 are shown connected to the right hand pair of aneroid capsules 14, 16. Because altitude is not linearly related to pressure variation, the linkage 22, 24 and 28, 32 is non-linear in accordance with conventional altimeter design.

For purposes of explanation of the schematic diagram of FIG. 1, the connecting post 20 is shown as extending to the left of the outermost capsule 10 but in accordance with the practice of one aspect of the present invention, as will be more fully explained with reference to FIG. 2, this connecting post will in fact be located internally of the capsule hubs. The same is true of post 28.

The inward or outward motion of the post 20, caused by contraction or expansion of the aneroid capsules 10, 12, is converted by connecting link 22 and crank 24 to rotary motion of the shaft 26. The shaft 26 is rigidly connected to a quadrant gear 36 of conventional design, and similarly the right hand shaft 34 is connected to a quadrant gear 38. Obviously it is possible to use a segment gear which may have a curved toothed arc not equal to 90°; it is conventional in altimeters, however, to use a segment gear that is approximately 90° and therefore can strictly speaking be termed a quadrant gear. The quadrant gears 36, 38, drive pinions 40 and 42 respectively, each of which constitutes an input to a differential gear assembly 44. The differential assembly is preferably of the type described in a copending application entitled "Differential Output for Barometric Instrument" filed on the same day as the present application (Graham A. Ireland et al.). The output of the differential gear assembly is transmitted to an output shaft 46. The output shaft drives a gear 49 meshing with and driving gear 50 acting as input to a spring loaded coupling generally designated as 48 which is preferably of the type described in a copending application entitled "Flexible Rotary Coupling" (Graham A. Ireland et al.) filed on the same day as the present application. The spring loaded coupling 48 in turn drives a shaft 51. Mounted on shaft 51 is the rotor 55 of a synchro control transformer 53. The rotor 55 is in turn connected to shaft 52 (which may be merely an extension of shaft 51) which drives rotary gears 54, 56 and 58 and output indicator shaft 60, to which is attached an indicating pointer 62. The shaft 60 through bevel gears 70, 72 drives shaft 69 and feeder-type counter 74. Pointer 62 and counter 74 indicate the altitude reading.

For the purposes of the schematic drawing, pointer 62 and mechanical linkage elements 20, 22, 24, 28, 30 and 32 are shown in plan and perspective although the other elements are shown in elevation view.

In accordance with modern practice, altitude readings may also be obtained from altitude computing apparatus (not shown) whose output is applied via synchro control transformer 53 and operational amplifier 64 to a servo motor 66 which also drives shaft 68. Thus, the altitude reading may come either from the servo input via motor 66 and shaft 68 or from the barometric input via shaft 52. In order that the mechanism function satisfactorily in case the two inputs are not identical, as will often happen, the flexible coupling 48 permits the discrepancy in input to be absorbed by the mechanical linkage of the coupling without unduly stressing any portion of the mechanical system.

The outer casing 57 of the synchro-control transformer 53 is rotatable and may be turned by annular gear 76 fixed to the outer periphery of the synchro control transformer 53.

Annular gear 76 is driven via idler 78 by pinion 81 mounted on shaft 83. Also mounted on shaft 83 is a bevel gear 85 and pinion 91. The bevel gear 85 drives meshing bevel gear 87 which in turn drives a barometric counter assembly 89, which is preferably of the type described in a copending application entitled "Non-Linear Counter" filed on the same day as the present application in the name of J. R. B. Steacie. Shaft 83 may be turned manually by a knob 97 attached to one end of the shaft 83.

The entire casing for the aneroid sub-assembly (i.e., that part of the assembly lying below line Z—Z in FIG. 1) terminates in an uppermost circular plate 93 whose outer periphery is toothed to mesh with pinion 91. Bearings 95 interposed between shaft 46 and the plate 93 permit the entire barometric sub-assembly to rotate about the shaft 46 as the knob 97 is turned. Turning the knob 97 also has the effect of rotating the annular gear 76 and thus the outer casing 57 of the synchro control transformer 53.

The purpose of having the manually adjustable knob 97 and the mechanism driven by it is to permit the operator of the instrument to change the pressure setting of the indicating mechanism to take into account the datum barometric pressure. According to conventional specifications, the navigational computer will be designed to an assumed barometric pressure of 29.92 inches of mercury. The operator of the altimeter, e.g. an aircraft pilot, will have to be able to adjust the instrument to some other datum barometric pressure for the purpose of landing and taking off, because it is essential at low altitudes that the instrument give a correct altitude reading according to actual prevailing conditions. The details of the pressure-setting portion of the apparatus are more fully described in the aforesaid J. R. B. Steacie patent application, and are not a part of the present invention.

Figure 2:
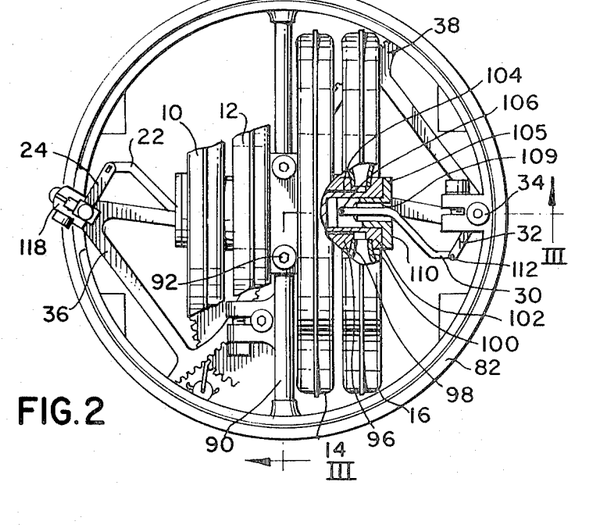
FIG. 2 is an end view, partially broken and partially in section, of an embodiment of a barometric altimeter sub-assembly constructed in accordance with the invention.
Figure 3:
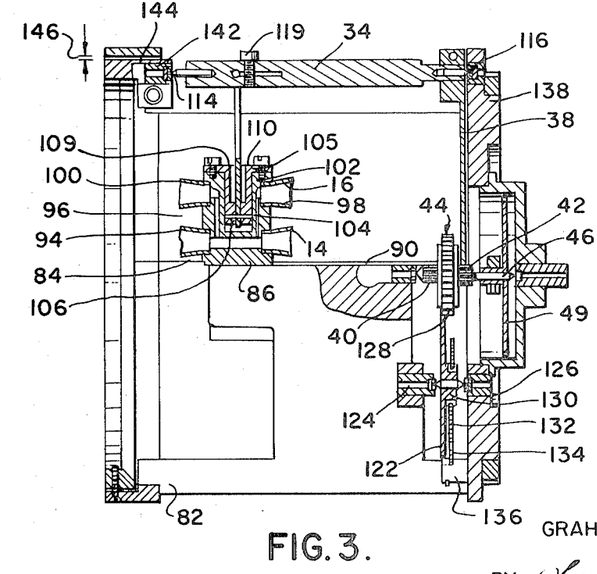
FIG. 3 is a section view, partially broken, of the barometric subassembly of FIG. 2 taken along line III—III in FIG. 2.
Figure 4:
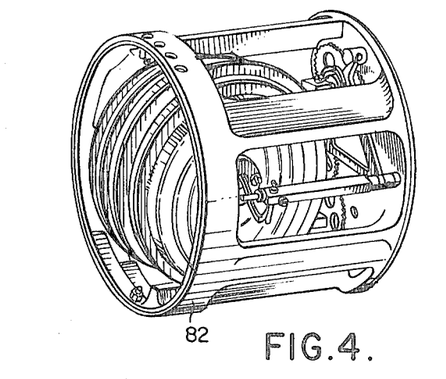
FIG. 4 is a perspective view (half-scale) of the barometric subassembly of FIGS. 2 and 3.

Referring now to FIGS. 2, 3 and 4, which show a more detailed embodiment of the aneroid sub-assembly of the altimeter of FIG. 1, a generally cylindrical frame 82 is illustrated which houses this portion of the altimeter. Aneroid capsules 10 and 12 are shown only in a fragment view and the following discussion of the mounting and hub attachments for the right hand aneroid capsules 14 and 16 will of course be applicable also to the construction of the corresponding elements associated with capsules 10 and 12.

Capsules 14 and 16 constitute a dual aneroid assembly. The innermost wall 84 of the capsule 14 terminates centrally in a fixed end hub fitting 86 which is rigidly fixed to central cross piece 90, rigidly attached to the frame 82, by means of mounting screws 92. Means (not shown) may be provided in association with mounting screws 92 to enable adjustment of the positions of the aneroid capsules 14 and 16.

The outer wall 94 of the capsule 14 terminates centrally in hub spacer element 96 which is also rigidly fixed to the innermost wall 98 of the capsule 16, and thus prevents the outermost wall 94 of the capsule 14 from directly touching the innermost wall 98 of the capsule 16.

As so far described, the hub design is conventional. However, the outermost wall 100 of the outermost capsule 16 is connected to a novel outer hub fitting 102 which is shown as having a cup shape, with the cup projecting inwardly and whose side walls 104 are spaced radially inwardly from the inner periphery of the spacer 96. To the cup-shaped hub element 102 is fitted a pivot mount 105 in which is fixed a pin 106 located between the outer face 110 of the pivot mount 105 and the cross piece 90. The exact location of the pin in relation to the dimensions of the assembly will be discussed further below. Pivotally attached to the pin 106 is connecting link 30 which is spaced from the side walls 109 of the pivot mount assembly 105, thereby permitting the connecting link 30 to move freely regardless of the expansion and contraction of the aneroid capsules 14 and 16 with pressure variations.

The connecting link 30 is pivotally connected to a crank 32 by means of a pin 112. The crank 32 is rigidly and adjustably fixed to rocker shaft 34. The rocker shaft 34 is in turn rigidly connected to quadrant gear 38 by means of a screw assembly 119 (FIG. 3) which permits adjustment of the quadrant gear 38 on the shaft 34.

It will be noted that the connecting arm 30 has an exaggerated Z-shape rather than the simple straight shape shown in FIG. 1 in order that it does not strike the fitting 105. The actual dimensions of the connecting arm 30 and the crank 32 will of course be selected, along with the other elements in the linkage, according to conventional design practice, to effect the correct non-linear functional relationship between the pressure and altitude.

The quadrant gear 38 drives pinion 42 of differential unit 44, and it will be understood that the corresponding quadrant gear 36 for the left hand pair of aneroid capsules 10, 12, drives the other input pinion 40 of the differential unit 44. The output of the differential unit 44 is transmitted via differential output shaft 46 to gear wheel 49, which may in turn drive the flexible coupling 48 (see FIG. 1). The specific gear and shaft arrangements for the output barometric motion are in any event not a part of the present invention.

In order to eliminate free play or backlash in the linkage, a spring loaded gear 122 may be provided pivotally mounted in end bearings 124 and 126 fixed to the frame 82, and which meshes with teeth on the planetary unit 128 of the differential gear arrangement 44. The hub 130 of the toothed wheel 122 is shown connected to a coil spring 132 one end 134 of which is fixed to the frame at 136. Accordingly, the entire assembly is maintained under a slight tension as a result of the force supplied by the weak coil spring 132, eliminating free play and backlash in the system.

Figure 5:
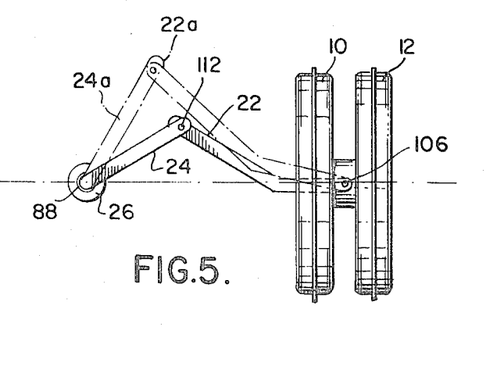
FIGS. 5 and 6 are schematic diagrams illustrating the effect of temperature variations on the aneroid capsule output linkage of a barometric device constructed according to the present invention.

The need for temperature compensation in the altimeter can be understood by a consideration of FIG. 5. FIG. 5 is a simplified diagram showing in solid lines the aneroid capsules 10 and 12, connecting link 22, crank 24, and the shaft 26. If we assume that pivot point 88 (the point of connection of crank 24 taken at the axis of rotation of shaft 26) and the pivot point defined by pin 106 are fixed in the altimeter (as they would be at constant altitude) then it is apparent that a temperature expansion which has the effect of lengthening the connecting link 22 to the exaggerated position shown in broken lines as 22a together with a lengthening of the crank 24 so that it assumes the exaggerated position indicated in broken lines at 24a, will cause a rotation of the shaft 26 in the counterclockwise direction. However, it is obvious that any rotation of the shaft 26 except as the result of an altitude change is undesirable.

Figure 6:
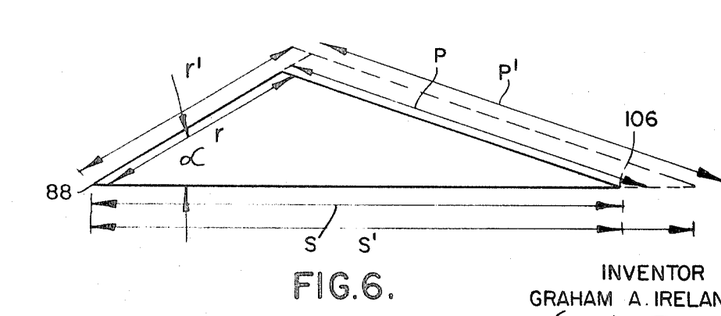

The problem can be simplified as illustrated in FIG. 6 (which, for clarity, is drawn to twice the scale of FIG. 5). If the pivot points 106, 112, and 88 are considered as the three apexes of a reference triangle, the reference triangle will have sides $p$, $r$ and $s$ as illustrated in FIG. 6. Arms $p$ and $r$ of the triangle of FIG. 6 correspond physically to connecting link 22 and crank 24 in FIG. 5. However, there is no direct physical link in FIG. 5 corresponding to side $s$ of the reference triangle of FIG. 6.

It will be apparent that in order to maintain the altitude reading constant despite the alterations in the lengths of the sides of the reference triangle caused by temperature changes, each side of the triangle must vary by the same proportion. For example, as arm 24 expands, dimension $r$ in FIG. 6 may reach a new value of $r'$. Likewise, dimension $p$ in FIG. 6, may, upon expansion of link 22 with temperature, reach a new value $p'$. It can readily be perceived that the angle $\alpha$ of the crank 24 with respect to the aneroid axis, which is required to be kept constant in order to maintain constant altitude reading despite temperature changes, will be the same provided that reference triangle $prs$ is similar to reference triangle $p'r's'$. This can be accomplished, according to the present invention, by the following three characteristics:

(1) The location of pin 106 is such that, thermal motion of the aneroid hub fittings is exactly matched by thermal motion in the opposite direction of cup-shaped element 102.

(2) Link 22 and crank 24 are made of materials having a net temperature coefficient of expansion corresponding to that of the aneroid capsules as mounted (preferably with a coefficient of expansion no greater than that of the frame 82). Because of the geometry of the configuration, it is obvious that proper selection of the link material is more critical than proper selection of the crank material.

(3) The pivot point 88 is arranged to shift such that, upon an increase of $r$ to $r'$ and $p$ to $p'$, the distance $s$ will increase to the value $s'$ such that the reference triangle $p'r's'$ is similar to the reference triangle $prs$.

The structural features which make possible the hub fitting temperature compensation are the elements of the novel aneroid hub assembly already described with reference to FIGS. 2 and 3. The specific choice of dimensions and materials will be discussed further below with reference to FIG. 9.

Briefly, it can be seen that as temperature rises, the entire right hand aneroid assembly comprising the capsules 14 and 16 and their connecting elements tends to move outwardly (to the right as viewed in FIG. 2) from the center piece 90, since the only fixed point of connection of the entire assembly to the frame is by means of the fitting 86. This outward motion would tend to move the pin 106 outwardly or to the right as viewed in FIG. 2. However, because of the cup-shaped form of the hub element 102, as temperature rises, this cup-shaped element tends to expand in a direction away from its fixed point at the outermost end of the aneroid assembly—in other words, the motion of the element 102 caused by temperature expansion is directed inwardly thus tending to move the pin 106 inwardly. The inward motion of element 102 thus tends to balance the outward motion of the capsules 14, 16. If the dimensions of the various elements and the metals of which they are made are properly selected, it can be seen that the pin 106 can be made to move inwardly by the same amount that the hub fittings move outwardly for a given increase in temperature. It will be obvious that element 102 need not be cup-shaped—it could be C-shaped, for example; or two L-shaped members diametrically opposed could be used with pin 106 connected between the free ends of the L-shaped members.

Figure 7:
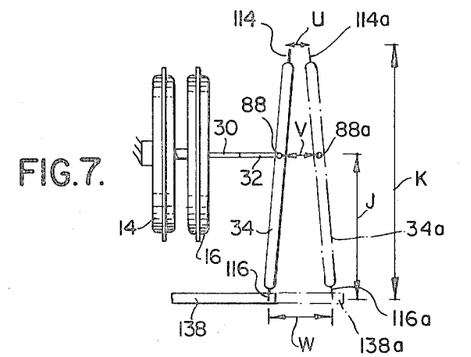
FIG. 7 is a schematic diagram illustrating the shaft displacement temperature compensation feature of the present invention.

Turning now to the problem of adjustment of the position of the pivot point 88 to maintain the angles of the reference triangle constant, it is useful to consider this problem with reference to the schematic drawing of FIG.

7. The shaft 34 is mounted at pivot point 116 in end portion 138 of the frame 82. The connecting link 32 is attached to the shaft 34 at point 88. The shaft 34 also is provided with an upper pivot 114, which is mounted in a special way according to the invention, as will be described further below.

As the portion 138 of the frame 82 expands with increasing temperature, it may, for example assume the exaggerated position 138a shown in FIG. 7, which moves the pivot 116 through distance w to a new position 116a. It will be evident from FIGS. 5 and 6 that it is desired that the shaft 34 assume a new position 34a such that the connecting point 88 moves to new position 88a through a distance v where v is the difference between the distances s' and s in the reference triangle of FIG. 6 required to maintain the new reference triangle p'r's' similar to the reference triangle prs. The distance w between the pivot position 116 and the pivot position 116a for a given temperature variation can be determined from a simple calculation based upon the expansion characteristics of the material out of which the frame portion 138 is constructed. Accordingly, it is possible to move point 88 through precisely the distance v over the same temperature variation provided that the distance u through which pivot 114 moves to a new position 114a as a result of the temperature increase, can be precisely controlled. It is a further feature of the present invention that the distance u is thus controlled with reference to the known expansion distance w and the known distances j and k of the point 88 from the pivot points 114 and 116 respectively.

This is conveniently accomplished by using a bimetallic arrangement of a suitable kind (i.e. an arrangement using two metal elements having different coefficients of expansion) in order to make possible the desired dimensional variation u. A preferred bimetallic arrangement will now be considered with reference to FIGS. 2, 3 and 8.

Figure 8:
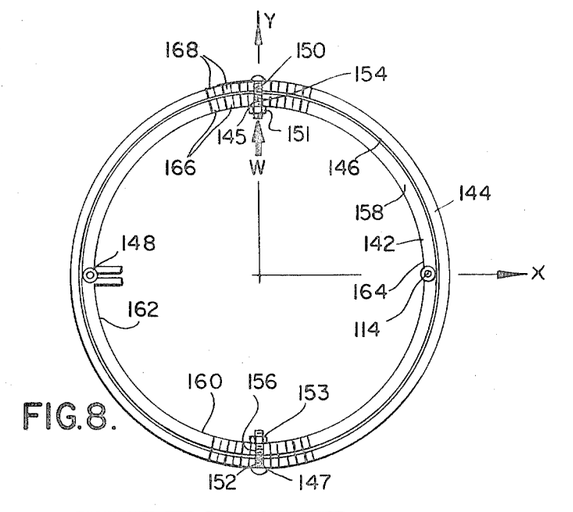
FIG. 8 is a partial end view of the barometric subassembly of FIGS. 2-4 showing the use of a temperature-compensating ring according to the present invention.

It can be seen from FIG. 3 that the right hand bearing 116 for rocker shaft 34 is fixed to end plate 138 of the frame 82, but the left hand bearing 114 is mounted in circular ring 142 which is separated for the greater portion of its circumference from the annular extension 144 of the frame 82 by a slight clearance 146 (see FIG. 8). Bearing 148 for spindle 26 is located at a point on annular element 142 approximately diametrically opposite the bearing 114. Approximately midway between the two bearings 114 and 148 along the ring 142 are oppositely disposed holes 145, 147 which are aligned with mating holes 150, 152 respectively on the annular extension 144 of the frame 82. Bolts 154, 156 and nuts 151, 153 can be used to fix the bearing support ring 142 to the annular frame extension 144.

As the frame 82 expands, the entire annular frame extension 144 will also expand. If the bearing support ring 142 is made of material with a relatively low temperature coefficient of linear expansion, for example stainless steel, then as the annular frame extension 144 moves radially outwardly, it forces the nuts 151, 153 also to move outwardly, thereby forcing the uppermost portion 158 and lowermost portion 160 (as viewed in FIG. 8) of the bearing support ring 142 to move outwardly also. However, this outward motion of the upper and lower ends (as viewed in FIG. 8) of the bearing support ring 142 forces the left and right sides 162, 164 thereof to move inwardly towards the center of the configuration in FIG. 8. Thus, while outward expansion of the frame 144 tends to move the rocker shafts 26 and 34 outwardly, and indeed has this effect at one end (the lower end as viewed in FIG. 7) of the unit, this effect is counteracted by reduced outward motion or even inward motion of bearings 114 and 148 at the other end of the barometric unit. By proper selection of dimensions and materials, it is possible to arrange the required displacement u to bring about a displacement v in FIG. 7 such that triangle p'r's' in FIG. 6 is similar to triangle prs for any temperature change likely to be encountered.

Because the desired interaction of the ring 142 and the frame extension 144 may require some fine adjustment, a plurality of additional holes 166 may be provided in the bearing support element 142 and mating holes 168 provided in the annular frame extension 144. The nuts and bolts can then be removed from the positions they are shown as occupying in FIG. 8 and inserted in another pair of mating sets of holes.

It will be clear that each of the rings 142 and 144 exerts a stress on the other as the temperature varies. Thus as temperature rises, the inner ring tends to pull the outer frame extension inwards at the point of attachment as well as vice versa. However, provided that the dimensions of the rings are properly selected and provided that the inner ring has a coefficient of linear expansion which is properly chosen with respect to that of the outer ring, a satisfactory relationship can be maintained. Obviously, the coefficient of expansion of the inner ring material should in general be lower than that of the frame, in order that the outward expansion of the frame should stress the inner ring and constrain bearings 114, 148 to move inwardly. On the other hand, if the coefficient of expansion of the frame were lower than that of the aneroid capsules, the ring 142 would then be located outside the frame extension 144, and would have a higher coefficient of expansion than that of the frame.

It will be equally obvious that the geometry of the frame need not be cylindrical, since there are only two points of attachment of the frame to the ring. Also, while a circular ring has been described, it will be obvious that other ring geometries could be employed, although generally less conveniently. Finally, it will be within the ordinary skill of a person skilled in bimetalic technology to devise other bimetallic arrangements to obtain the same result.

EXAMPLE

Figure 9:
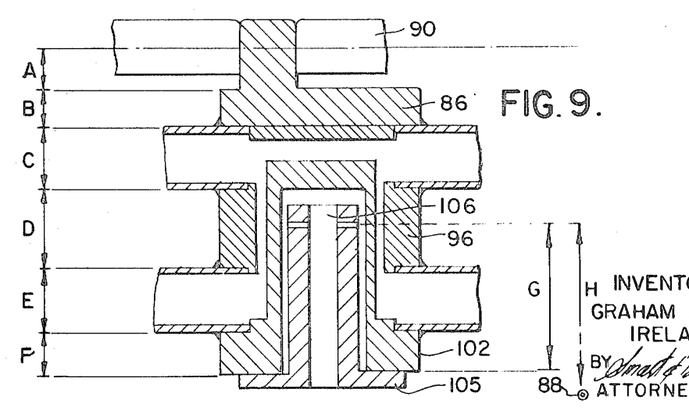
FIG. 9 is a schematic diagram illustrating the analysis of dimensional variation with temperature of a portion of the sub-assembly of FIGS. 2-4.

The following example will be discussed with reference to FIG. 9. It can be seen that the portions of the aneroid hub assembly contributing to radial expansion or contraction (using "radial" with reference to the circular frame 82; obviously we are concerned with "axial" expansion and contraction with reference to the aneroid hub assembly) can be divided into dimension A being the distance from the center of centerpiece 90 to the edge of hub mounting piece 86, dimension B being the thickness of hub mounting piece 86, dimension C being the thickness of the inner aneroid capsule 14, dimension D being the thickness of the spacer element 96 between the aneroid capsules 14 and 16, dimension E being the thickness of the hub of aneroid capsule 16 and dimension F being the thickness of the outer hub spacer element 105. Dimension H is the distance between the center of pin 106 and point 88 (see FIG. 7), which is the point of attachment of the crank 32 to the rocker shaft 34. The pin 106 is spaced a dimension G from the outer surface of spacer element 102.

It is convenient to make elements 86 (including the extension of this element into the centerpiece 90), 96 and 102 of the same material, for purposes of simplicity of calculation. Suppose for example that these elements are made of type 416 stainless steel and that dimension A=dimension B=.080 inch, dimension D=.160 inch, and dimension F=.092 inch. The total of these dimensions is .412 inch, and if the temperature range over which temperature compensation is required is the range −135° F. to +90° F., the change in radial dimension for the combination of dimensions, A, B, D and F is given by the formula $\Delta L = \beta \cdot \Delta T \cdot L$, where L=change in length, $\beta$=linear coefficient of expansion, $\Delta T$=temperature change, and L=length. Using the known coefficient of expansion for type 416 stainless steel, it will be found that the total dimensional difference over the temperature range contemplated is .000521 inch.

In order to compensate for the dimensional variation of dimensions A, B, D and F over the temperature range contemplated, dimension G should be selected and the material in cup-shaped element 102 should be selected so that the dimensional variation in G over the same temperature range is substantially identical to the dimensional variation of dimensions A, B, D and F over the same temperature range. By selecting type 316 stainless steel as the material for the cup-shaped element 102, and by selecting 0.2843 inch as the dimension G, it can be determined by using the same formula $\Delta L = \beta \cdot \Delta T \cdot L$, that the dimensional variation is substantially identical, being theoretically .000523 inch over the same temperature range.

Thus, elements 86, 96 and 105 can be completely neglected because of the provision of the cup-shaped element 102 which exactly temperature-compensates these elements regardless of the prevailing temperature and altitude within the temperature range considered.

Dimensions C, E and H are obviously dependent on altitude, changing by reason of the expansion of the aneroid capsules with increases in altitude, and contraction of the capsules with decreasing altitude. However, it will be immediately observed that the dimension H decreases with altitude by exactly the same amount that dimensions C and E increase with altitude. Accordingly, complete independence of temperature compensation from altitude can be obtained provided that the materials out of which the elements comprising dimensions C, E and H are made are selected to provide that the correct shaft displacement $v$ (see FIG. 7) is obtained. It was found that nickel-iron-chromium alloy sold under the trademark NiSpan was suitable for the capsule material, but the capsule as mounted was found to have an overall temperature coefficient of expansion slightly different from that of NiSpan, so the materials of which the crank arms and links are made would have to be selected accordingly.

If the point 88 is located so that dimension $j$ in FIG. 7 is 1.5 inches and dimension $k$ is 2.0 inches, then it will be found that the required displacement $v$ over the temperature range $-135°$ F. to $+90°$ F. is equal to the sum of the dimensional variations in dimensions C, E and H over this range, and if C=E=.129 inch and H=.8643 inch, the dimensional variation $v$ will be calculated according to the formula $\Delta L = \beta \cdot \Delta T \cdot L$ to be .000980 inch. Likewise, it can be calculated that over the same temperature range, if the frame 82 including frame end piece 138 (FIG. 7) is made of aluminium alloy, and is assumed to expand freely, dimension $w$ over the same temperature range can be calculated to be .00363 inch. Using these results and the geometry of FIG. 7, the value $u$ will be found to be very nearly zero. (The utility of the invention, however, does not depend on $u$ being zero—it could be a positive or negative value.)

Accordingly, the dimensions and materials of the ring 142 (FIG. 8) must be selected so that the net displacement of pivot points 114 and 148 are zero in a radial direction.

If the mean diameter of the ring 142 is 2.6 inches, and the material is type 416 stainless steel, then over the temperature range in question the dimensional variation in a radial sense of this ring will be found to be $1.61 \times 10^{-3}$ inches, using the formula $\Delta R = \beta \cdot \Delta T \cdot R$, where R=radius and $\Delta$R=change in radius. Similarly, the thermal expansion of the aluminium frame can be calculated to be $8.0 \times 10^{-3}$ inches.

Given a stainless steel ring 142 connected at diametrically opposite points and loaded radially outwards by force W in the Y direction (FIG. 8), it is known that $$Dxs = 0.137 \frac{WR^3}{EI} \text{ and that } Dys = .149 \frac{WR^3}{EI}$$

where $Dxs$=diametrical displacement of the steel ring 142 between the bearings 114, 148 in the X direction (FIG. 8) due to force W;

$Dys$=diametrical displacement due to stress of the steel ring 142 between the points of attachment to the aluminium frame extension 144 (assumed perpendicular to $Dx$), due to force W;

W=force applied at the points of attachment to the frame extension 144;

E=elastic modulus of the material of ring 142=$29 \times 10^6$ for this example;

I=moment of inertia of the ring 142.

In the above formula, if the cross section of the ring 142 is taken to be rectangular, then the moment of inertia is given by the formula $$I = \frac{BH^3}{12}$$

where

B is the axial dimension of the ring 142, and
H is the radial dimension of the ring 142.

(Obviously, other cross sectional shapes could be used in which case the moment of inertia formula would be different.)

It is known that the required displacement $Dxs$ of the steel ring 142 must be equal and opposite to its thermal expansion to yield a net zero displacement. Thus, $Dxs = 2 \times 1.61 \times 10^{-3}$ inches, i.e. $3.22 \times 10^{-3}$ inches. Accordingly, the displacement of the ring in the Y direction is given by $$Dys = \frac{.149}{.137} Dxs = 3.50 \times 10^{-3} \text{ inches}$$

It is possible to write an equilibrium equation in respect to the Y axis of the following form:

$$\Delta ys + D_{ys} = \Delta ya - D_{ya}$$

where $\Delta ys$=Thermal expansion of the steel ring=$+3.22 \times 10^{-3}$ $D_{ys}$=Displacement of the steel ring due to force $W = +3.50 \times 10^{-3}$ $\Delta ya$=Thermal expansion of the aluminum ring $= 8.0 \times 10^{-3}$ $D_{ya}$=Displacement of the aluminum frame due to W.

Therefore, $D_{ya} = -1.28 \times 10^{-3}$

Experimentally, the above calculated deflection of the aluminum frame was found to correspond to a force applied of 2.84 pounds. This force obviously must be balanced by the force acting on the ring 142. Accordingly it is possible to calculate from the above formula $$Dys = .149 \frac{WR^3}{EI}$$

that the required moment of inertia I of the ring 142 is $9.0 \times 10^{-6}$. If axial dimension B is selected to be .187 inch, then radial dimension H should be .0832 inch for the ring 142.

This theoretical calculation was found to agree reasonably satisfactorily with calculated test data, but fine adjustments could be made using the plurality of holes 166 illustrated in FIG. 8. The theoretical calculations should not be expected to work exactly, because of imprecise geometry, non-uniform alloy batches, etc.

In this example, the ring 142 was chosen as stainless steel. It may be desired to have a ring material whose rapidity of temperature response is more nearly the same as that of the aluminium frame, in which case bronze might be chosen instead of stainless steel. The above specific figures would then of course not apply, but the above approach to the problem would still be satisfactory.

What I claim as my invention is:

1. A pressure-responsive instrument comprising a frame, an aneroid capsule, fittings for mounting the capsule in the frame, a connecting link pivotally connected to the capsule, a rotatably mounted shaft, and a crank fixed to the shaft and pivotally connected to the connecting link whereby linear motion of the aneroid capsule in response to pressure changes is converted to rotary motion of the shaft, temperature compensation means for maintaining the reference triangle defined by three apexes at any one temperature in a predetermined temperature range similar to the reference triangle defined by the said three apexes at any other temperature in said predetermined temperature range, said apexes being as follows:

(1) the pivot point of connection of the connecting link to the aneroid capsule;
(2) the pivot point of connection of the connecting link to the crank;
(3) the point of connection of the crank to the shaft taken at the axis of rotation of the shaft.

2. An instrument as defined in claim 1, wherein the crank and connecting link are made of materials selected so that their temperature coefficient of expansion matches that of the aneroid capsules as mounted and including temperature-responsive means for moving the first apex along the direction of said linear motion of the capsule by an amount equal and opposite to the motion of the fittings caused by a change in temperature, and temperature-responsive shaft displacement means for displacing the axis of rotation of the shaft so that the third apex moves with respect to the first apex in response to temperature changes according to the equation $$\Delta L = \beta \cdot \Delta T \cdot L$$

where
$\Delta T$ is the temperature change;
$\Delta L$ is the change in position of the first apex with respect to the third apex for the temperature change $\Delta T$;
L is the distance between the first and third apexes; and
$\beta$ is the linear temperature coefficient of expansion of the aneroid capsule as mounted.

3. An instrument as defined in claim 2 wherein the aneroid capsule is provided with a hub and means for fixing the hub to the frame, and wherein the means for moving the first apex is a hub compensation element whose outer end is fixed to the outer end of the fittings and whose inner end is free to move with respect to the fittings, and wherein the pivot point of connection of the connecting link to the capsule is fixed to the inner end of said hub compensation element, the materials and dimensions of the hub compensation element and the location of said last mentioned pivot point of connection being selected so that the displacement of said last-mentioned pivot point with respect to the outer end of the hub in response to a temperature change is equal and opposite to the expansion or contraction of the fittings in response to said last-mentioned temperature change.

4. An instrument as defined in claim 3, wherein the shaft displacement means has a coefficient of expansion different from that of the frame and is fixed to the frame so that a predetermined change in temperature causes a predetermined displacement of said shaft displacement means with respect to the frame having a displacement component opposite to that due to the last mentioned temperature change along a line parallel to the line joining the first and third apexes, and wherein the shaft is rotatably mounted in said shaft displacement.

5. An instrument as defined in claim 3, wherein the shaft displacement means comprises a ring in a plane parallel to the plane containing the reference triangle and fixed to the frame at two generally diametrically opposite points on a line generally or approximately perpendicular to the line joining the first and third apexes, one end of the shaft being rotatably mounted on a shaft-bearing portion of the ring intermediate the said two diametrically opposite points, the temperature coefficient of expansion of the ring being lower than that of the frame, whereby the expansion of the frame stresses the ring so that the component of the displacement of the shaft-bearing portion of the ring due to stress is in the opposite direction along a line parallel to the line joining the first and third apexes, to the component of the last-mentioned displacement due to the temperature change causing said last-mentioned expansion.

6. An instrument as defined in claim 3, wherein the shaft displacement means comprises a bimetallic arrangement.

7. An instrument as defined in claim 2, wherein the shaft displacement means has a coefficient of expansion different from that of the frame and is fixed to the frame so that a predetermined change in temperature causes a predetermined displacement of said shaft displacement means with respect to the frame having a displacement component opposite to that due to the last mentioned temperature change along a line parallel to the line joining the first and third apexes, and wherein the shaft is rotatably mounted in said shaft displacement.

8. An instrument as defined in claim 7, wherein the shaft displacement means comprises a bimetallic arrangement.

9. An instrument as defined in claim 2, wherein the shaft displacement means comprises a ring in a plane parallel to the plane containing the reference triangle and fixed to the frame at two generally diametrically opposite points on a line generally or approximately perpendicular to the line joining the first and third apexes, one end of the shaft being rotatably mounted on a shaft-bearing portion of the ring intermediate the said two diametrically opposite points, the temperature coefficient of expansion of the ring being lower than that of the frame, whereby the expansion of the frame stresses the ring so that the component of the displacement of the shaft-bearing portion of the ring due to stress is in the opposite direction along a line parallel to the line joining the first and third apexes, to the component of the last-mentioned displacement due to the temperature change causing said last-mentioned expansion.

10. An instrument as defined in claim 2, wherein the shaft displacement means comprises a bimetallic arrangement.

11. A pressure-responsive instrument comprising a generally cylindrical frame; a centrepiece lying alone a diameter of the cylindrical frame and fixed to the frame; an aneroid capsule assembly having a hollow hub assembly including fittings for attaching the capsule assembly to the centrepiece, the capsule assembly providing a linear displacement of the outer end of the hub assembly in a generally radial direction with respect to the cylindrical frame and perpendicular to said diameter, in response to changes in ambient pressure; a generally cup-shaped element having its inner end free inside the space defined by the hollow hub assembly and its outer end fixed to the outer end of the hub assembly; a connecting link the inner end of which is pivotally connected to the inner end of the cup-shaped element, a ring mounted at one end of and inside the cylindrical frame and fixed to the frame at two generally diametrically opposite points on a line generally or approximately parallel to the diameter along which the centrepiece lies, being otherwise free from the frame; a shaft one end of which is rotatably mounted in a shaft-bearing portion of the ring intermediate the said opposite points and the other end of which is rotatably mounted in the opposite end of the frame; a crank one end of which is fixed to the shaft at a point intermediate its mountings, the other end of the crank being pivotally connected to the connecting link whereby linear movement of the outer end of the hub assembly is converted to rotary movement of the shaft; the angles of a reference triangle defined by three apexes being maintained constant, for a given ambient pressure, over a predetermined temperature range, the said apexes being as follows:

(1) the pivot point of connection of the connecting arm to the cup-shaped element;

(2) the pivot point of connection of the connecting arm to the crank,
(3) the point of connection of the crank to the shaft taken at the axis of rotation of the shaft;

said constancy of angles of the reference triangle being caused by the following features:
(a) the displacement of the first apex with respect to the outer end of the hub assembly caused by a given temperature change is equal and opposite to the expansion or contraction of the fittings from the centre of the cylinder caused by said given temperature change;
(b) the material out of which the crank and connecting arm are made has a temperature coefficient of expansion the same as that of the aneroid capsules as mounted;
(c) the displacement of the third apex is governed by the equation $\Delta L = \beta \cdot \Delta T \cdot L$ as a result of the opposite directions of the displacement components of the shaft-bearing portion of the ring due to the said last-mentioned temperature change and the change in stress imparted to the ring by the frame respectively:

where
$\Delta T$ is the last-mentioned temperature change,
$\Delta L$ is the displacement of the third apex caused by said last-mentioned temperature change,
$L$ is the distance between the first and third apexes, and $\beta$ is the linear temperature coefficient of expansion of the material out of which the crank and connecting link are made.

12. A temperature compensated pressure-responsive instrument comprising pressure responsive means providing an output in the form of linear motion in response to changes in ambient pressure, a shaft rotatably mounted in a bearing, a crank fixed to the shaft and receiving the output motion of the pressure responsive means and converting said output motion to rotary motion of the shaft, and means for controlling the displacement of said bearing in response to variations in temperature so as to maintain the angle of rotation of the crank with respect to the shaft axis constant over a predetermined temperature interval, at a given ambient pressure.

13. An instrument as defined in claim 12 wherein the crank receives said motion via a link connecting the crank to the pressure responsive means, and where in the reference triangle defined by the following apexes, viz., the axis of the shaft at the point of attachment of the crank, the point of attachment of the crank to the connecting arm, and the point of attachment of the connecting arm to the pressure responsive means, is maintained similar over a predetermined temperature interval.

14. A temperature compensation device as defined in claim 13 wherein the materials out of which the elements are made which comprise the physical counterparts of the sides of the reference triangle that have a net linear temperature coefficient of expansion equal to that of the aneroid capsule as mounted, along the lines defined by the sides of the reference triangle.

15. In a pressure-responsive instrument having at least one aneroid capsule having a hollow hub assembly one side of which is fixed to the instrument frame and the other side of which is connected to linkage transmitting the displacement of the capsule with pressure changes, the improvement comprising a C-shaped or cup-shaped element protruding into a space in the center of the hub assembly and fixed at its outermost edge, forming the lip of the cup, to the outermost edge of the capsule, the said element being connected to the said linkage in the vicinity of its innermost end and transmitting the displacement of the aneroid capsule to said connecting linkage, and wherein the dimensions of the said element and the material out of which it is made are selected so that inward motion of the said innermost portion of the element in one direction caused by a change in temperature is exactly the opposite of and substantially equal to the outward motion of the fittings of the hub assembly and the fittings connecting the capsule to the frame centerpost, whereby temperature compensation for said fittings is obtained.

References Cited
UNITED STATES PATENTS

| | | | |
|---|---|---|---|
| 2,140,704 | 12/1938 | Kollsman | 92—1 X |
| 2,388,027 | 10/1945 | Weil | 73—387 |

DONALD O. WOODIEL, Primary Examiner

U.S. Cl. X.R.

73—386

UNITED STATES PATENT OFFICE
CERTIFICATE OF CORRECTION

Patent No. 3,621,718            Dated November 23, 1971

Inventor(s) Graham A. Ireland

It is certified that error appears in the above-identified patent and that said Letters Patent are hereby corrected as shown below:

Column 8 line 66 and Column 9 line 40

-135° F to +90°F should be

-65° F to +160°F

Signed and sealed this 17th day of September 1974.

(SEAL)
Attest:

McCOY M. GIBSON JR.           C. MARSHALL DANN
Attesting Officer             Commissioner of Patents